T. A. EDISON.
METHOD OF BURNING PORTLAND CEMENT CLINKER.
APPLICATION FILED SEPT. 29, 1905.

1,152,613.

Patented Sept. 7, 1915.
5 SHEETS—SHEET 2.

Attest:
Edgeworth Greene
Delos Holden

Inventor:
Thomas A. Edison
by Frank L. Dyer, Atty.

T. A. EDISON.
METHOD OF BURNING PORTLAND CEMENT CLINKER.
APPLICATION FILED SEPT. 29, 1905.

1,152,613.

Patented Sept. 7, 1915.
5 SHEETS—SHEET 4.

Attest:
Edgeworth Greene
Delos Holden

Inventor:
Thomas A. Edison
by Frank L. Dyer Atty.

T. A. EDISON.
METHOD OF BURNING PORTLAND CEMENT CLINKER.
APPLICATION FILED SEPT. 29, 1905.

1,152,613.

Patented Sept. 7, 1915.
5 SHEETS—SHEET 5.

Attest:

Inventor:
Thomas A. Edison
by Frank L. Dyer, Atty.

UNITED STATES PATENT OFFICE.

THOMAS A. EDISON, OF LLEWELLYN PARK, ORANGE, NEW JERSEY.

METHOD OF BURNING PORTLAND-CEMENT CLINKER.

1,152,613.  Specification of Letters Patent.  Patented Sept. 7, 1915.

Original application filed December 5, 1902, Serial No. 134,017. Divided and this application filed September 29, 1905. Serial No. 280,577.

*To all whom it may concern:*

Be it known that I, THOMAS A. EDISON, a citizen of the United States, residing at Llewellyn Park, Orange, county of Essex, and State of New Jersey, have invented a certain new and useful Method of Burning Portland-Cement Clinker, of which the following is a specification.

My invention relates to an improved process or method of burning Portland cement clinker, the present application being a division of my Patent No. 802,631, granted Oct. 24, 1905.

At the present time Portland or hydraulic cement is produced by burning a mixture of cement rock and limestone in long rotary kilns, lined with firebrick and maintained at a slight angle, the heat obtained being produced by the combustion of pulverized coal, and a stack being connected at the upper end to permit of the escape of products of combustion and chemical decomposition. These prior kilns have been constructed generally of wrought iron, which warps very considerably under the effect of heat. For a number of years preceding my invention, the rotary kilns which have been used for burning Portland or hydraulic cement by the dry process have been of the standard length of about 60 feet, and an internal diameter of about five feet, and although somewhat longer kilns may have been suggested for the dry process, I am not aware that such kilns have been practically utilized or any advantages discovered therewith over the standard 60 foot kilns. With the standard 60 foot kiln, the ordinary length of the combustion or clinkering zone (*i. e.*, that portion of the burning fuel within whose longitudinal limits the temperature is sufficiently elevated to effect a complete clinkering operation) is about 10 feet, and this combustion zone extends from a point about 6 or 8 feet in from the lower or discharge end of the kiln to a point about 18 feet from that end. Consequently, there is a zone of only about 40 feet, or slightly more, through which the gases may pass in contact with the incoming material in movement toward the clinkering zone, and therefore, since the bulk of material is small, the gases do not part with much of their heat and pass up the stack at a very high temperature, ranging, according to one investigator, from 1500 to 1800 degrees F. Obviously, this heat is entirely lost. An additional loss in efficiency is also caused by the fact that the material moves so rapidly toward the combustion zone that it does not part with all of its carbon dioxid, and considerable quantities of carbon dioxid will be given off in the immediate neighborhood of and within the combustion zone, so as to increase the likelihood of a part of the coal burning to carbon monoxid, which sometimes becomes ignited in the stack and may actually burn beyond the stack in the outer air; and also, in any event, restricting the amount of coal that can be perfectly burned, limiting the longitudinal limits within which combustion may take place, and requiring an excess of air, which requires to be heated and therefore incurs additional loss. The limitation of the length of the combustion zone necessarily limits the amount of material which can be supplied to the kiln and the rate of progress of the material through the kiln. The rate of progression of heat from the periphery to the center of a partially clinkered ball, or other mass, is practically fixed, and is but slightly altered by raising the temperature to which the mass is subjected; hence to completely clinker the agglomerated mass of material formed in the early stages of burning, requires a definite period of time before real clinkering has advanced far beneath the surface. By reason of the limitations which have thus been experienced in the practical operation of standard 60-foot kilns, it has been found in practice impossible to increase the output of good clinker much beyond 10 barrels of 380 pounds each per hour, and even then, many of the clinker balls may not be fully clinkered throughout, but may contain underburnt centers having no cementing properties whatever. In the burning of cement under these conditions, the amount of pulverized coal used will vary from about 29 to 33 per cent. of clinker produced, or from about 110 pounds to 125 pounds of coal per barrel of cement. If it were attempted to increase the output of such a kiln by introducing more material therein, and increasing the amount of fuel burned, the combustion zone would be lengthened, but the loss due to the high temperature of the gases would be enormously increased, as well as the great loss due to the presence of large quantities of carbon dioxid causing the coal to be burnt to carbon monoxid instead of dioxid, and in consequence, the operation would be far less economical than at present. On the other hand, if it were attempted to increase the efficiency by increasing the rate of progression of material through the kiln so as to bring a larger amount of incoming material in contact with the escaping gases, sufficient time would not be allowed for properly burning the material, and the combustion would necessarily be more seriously affected by the generation of larger quantities of carbon dioxid in the combustion zone. Finally, if it were attempted to increase the quality of the output by decreasing the rate of progression of material through the kiln so as to thereby increase the time during which the material would be subjected to the effect of the clinkering temperature, the output would not only be curtailed, but the efficiency would be much reduced, for the reason that there would be a smaller amount of incoming material by which heat would be abstracted from the furnace gases, and the radiation losses being constant would be greater per unit of output.

It may be stated axiomatically, that the burning of Portland cement clinker should be characterized by the perfect combustion of the minimum relative amount of fuel in the presence of the maximum relative amount of cement material for a sufficient time to result in the complete clinkering of the latter. As above pointed out, the ideal conditions are not realized in practice with the standard 60 foot kilns, since even with the small amount of fuel practically burned the combustion is likely to be seriously affected by the generation of carbon dioxid in the combustion zone, the efficiency is poor, due to the imperfect combustion and to the loss of heat in the escaping furnace gases, and the quality of the clinker produced is very often imperfect, due to incomplete burning. I have discovered that the ideal conditions can be achieved by very greatly lengthening the kiln without proportionately increasing its diameter, whereby the relative proportion of length to diameter will be approximately one to twenty-seven, instead of one to twelve, as with present kilns. By reason of this change, I find it possible to perfectly burn very large quantities of pulverized fuel in the presence of enormous quantities of cement material, and at the same time carry on the operation so efficiently as to require only about 75 pounds (less than 20 per cent.) of coal per barrel of clinker; and finally, to produce a clinkered material of superior quality completely burned throughout.

In my earlier experiments with apparatus for burning clinker for the production of Portland or hydraulic cement, I had in mind principally the effecting of economy in the operation, by abstracting heat from the clinkered material by discharging the same into a separate cooling cylinder through which passed the air for supporting the combustion and by abstracting heat from the gaseous products of combustion by causing these gases to remain for a considerable time in contact with the incoming material before the latter reached the clinkering zone, and to this end, in the first form of kilns used by me, I constructed the apparatus of cast-iron sections, each supported by separate rollers, whereby the length of the kiln could be considerably increased. In such apparatus, I also lengthened the clinkering or combustion zone by projecting two streams of pulverized fuel into the kiln under different projecting pressures, and by preferably causing the combustion zones to overlap in order to thereby secure a considerable increase in the length of the clinkering or high temperature zone, proportional to the quantity of fuel used as described in my patents Nos. 759,356 and 759,357, dated May 10th, 1904. I have now found, as a result of experiment with kilns of my improved type, that there is a definite relation between the length and diameter of the kiln, the extent of the clinkering and combustion zone, and the load of material that is passed through the clinkering zone at a given time, whereby a maximum output of material is secured with the expenditure of a minimum amount of fuel per unit of product. I have determined experimentally from observations made with an actually constructed device that if the highest economy of fuel is to be obtained, it is primarily necessary to very greatly increase the length of the kiln, and at the same time to very greatly increase the load of material supplied to the same. I find that the best results are secured when the kiln, as compared with those now in use, is increased in length about two and one-half times, or to about 150 feet, and when its internal diameter is preferably increased from six inches to a foot, or to about five and one-half feet. With a kiln of substantially this size and substantially these proportions, it becomes possible to perfectly burn a sufficient amount of powdered coal as to extend the combustion and clinkering zone to from thirty to forty feet, or more than three times that possible with the present 60 foot kiln. At the same time, I find it possible to effectively and perfectly burn this relatively large amount of powdered coal over a relatively extended area in the presence of from four to seven times the amount of cement material in the kiln that would be possible with existing structures. With such a kiln there would be a zone of somewhat more than 100 feet in length through which the combustion gases would pass in contact with many times more incoming material than is the case in a 60 foot kiln, and in consequence, the exit gases are cooled considerably below a red heat, and probably not higher than 1000 degrees F. At the same time, this long cooling or regenerative zone permits the material to part with its carbon dioxid, all of which will be substantially driven off by the time the combustion zone is reached, so that there will be no tendency to imperfect combustion, as is the case with the present kilns. In other words, with my improved kiln, I am enabled without materially increasing the diameter, to perfectly burn a very much larger amount of pulverized coal in the presence of a proportionately larger quantity of material, and with such economy, in practice as to require only about 75 pounds of coal per barrel of clinker. I find that the amount of the load bears a definite relation to the internal diameter of the kiln, and it may be considered as axiomatic in this art, that the greater the load that can be carried in a kiln of a definite size, the greater will be the resulting economy. Thus, with a kiln of the usual diameter, an increase of the load of about four times that now employed, would give the best results, but to properly accommodate the added bulk of material, it is essential that the length of the kiln and of the clinkering and combustion zone should be very greatly increased, while the rate of feed of the material, and its progression should be such that the load is kept constant. I prefer, however, to increase the internal diameter of the kiln from six inches to a foot, so as to accommodate a load of from five to seven times greater than that which is now carried, resulting in a greater absorption of heat from the exit gases by the larger burden, and also, permitting of the production of a sufficient pressure, due to the weight of the load against the walls to form a very thick coating over the firebrick lining. When the cement material has reached a heat sufficient to make it somewhat plastic and sticky, it forms a coating several inches in thickness, which almost continuously covers the lining for that portion of the kiln that is subjected to the higher temperatures. Without the great pressure on the interior of the kiln, due to the very heavy load which is being carried, this protective lining thus formed, is neither even nor thick, and the bricks become exposed to the high heats within the kiln, which tend to rapidly destroy them.

By employing a long clinkering zone as explained, I increase the length of time during which the material is subjected to a clinkering temperature, and therefore, effect a complete clinkering of the agglomerated balls or masses. Such a result depends on the speed of rotation and the length of the clinkering zone, since as I have stated, an increase in the clinkering temperature does not appear to effect a corresponding increase in the rapidity with which the clinkering operation takes place. I find, in fact, that by employing a very long clinkering zone, so as to thereby increase the time during which the material will be subjected to a clinkering temperature, better results are secured than with a shorter clinkering zone, even if the temperature is actually somewhat reduced. In the formation of a long clinkering zone, it is preferable to have two or more streams of fuel thrown into the kiln by projecting devices of any desired type, arranged so that the clinkering zone will be formed from two or more sources of fuel. With a long clinkering zone, formed by two or more sources of fuel thrown into the kiln at different distances, it is desirable when the best economy and evenness of burning of the clinker are to be obtained, that the air if used for the projection of the fuel, should be only a small proportion of that necessary for combustion, so that any whirls which may be produced within the moving column of combustion air within the kiln, shall but slightly affect it.

Instead of projecting the pulverized coal directly into the kiln parallel to the longitudinal axis, I find that the best results are secured when the nozzles are so arranged as to project the fuel against the bore of the kiln, with a glancing effect and at an angle to the longitudinal axis, in order that the projected air and fuel will partake of a spiral course through the kiln. If the pulverized fuel is projected directly into the kiln, substantially parallel to the longitudinal axis, the heat is not only objectionably localized, but the projected air being substantially unretarded passes too rapidly through the kiln to secure the best results. By so directing the projected air that the streams of burning fuel will partake of a spiral course, the heat is not only more generally diffused, so as to extend the clinkering zone more uniformly around the entire bore of the kiln, but the projected air is retarded to some extent so as to thereby reduce its longitudinal movement through the kiln, and hence, secure the best results in practice. At the present time, the effort is made to insure proper regulation of the burning fuel by regulating the amount of its feed, and the speed of the kiln. Such a practice is, however, ineffective, difficult of close regulation, and is largely affected by atmospheric conditions. With my improved kiln, owing to its increased diameter, to its greatly increased length, and to the very much larger quantity of fuel consumed, the draft is much greater than with present kilns, and it is therefore necessary, in order to secure perfect regulation, to employ a damper arranged in the stack, so that it becomes possible, when the kiln has once reached the desired temperature, to maintain the supply of fuel and incoming material substantially constant, and at the same time the operation is independent of atmospheric changes. By thus using a regulating damper in the stack, the character of the escaping gases can be noted, and upon the appearance of any smoke, the damper requires merely to be slightly opened to increase the draft and secure thereby an added quantity of oxygen to make the combustion perfect. By thus maintaining the damper in such a position as to permit of a draft only slightly in excess of that which would result in the formation of smoke, the combustion will be always perfect, all of the coal being burned to carbon dioxid and no heat is lost by heating an excess of air over what is required for combustion. This would not be possible if the draft was not perfectly controllable to meet the conditions of the weather, and also as stated, if the kilns were not greatly lengthened, so that by the time the material reaches the combustion zone, the carbon dioxid will be driven off. With the ordinary kiln, it would not be so readily possible to regulate the combustion by means of the draft in the stack, even if a damper could be used in the presence of the extremely hot escaping gases, for the reason that the draft is relatively slight, and is therefore, not so susceptible of regulation, as with my improved kiln; and also, because no amount of regulation at the stack would affect the imperfect combustion, due to the presence in the neighborhood of the combustion zone, of large quantities of carbon dioxid.

As I have above indicated, with my present kiln I employ a cooling cylinder through which the clinkered material passes after leaving the kiln, and through which also the combustion air passes, in the opposite direction to abstract heat from the clinkered material. In order to secure a maximum heating effect of the entering combustion air, I preferably rotate the cooling cylinder at a relatively slow speed, and provide it at its lower end with a contracted discharge opening, so that a large bulk of clinkered material will be always carried by the cooling cylinder to thereby present an extended surface over which the combustion air passes. I also preferably provide the cooling cylinder with radial wings or flanges, extending longitudinally, so that when the cylinder rotates, the clinkered material will be carried upwardly by these wings or flanges and be showered downward through the entering air to increase the effect.

Such of the features of my invention to which I have generally referred as relate strictly to apparatus, have been claimed in said Patent No. 802,631, and I propose in the present case to claim those other features of my invention as relate more particularly to a method or process of burning Portland cement clinker.

My improved process therefore relates in the first place to the maintenance of a combustion zone at or above a clinkering temperature and to the feeding of cement material toward and through the combustion zone at such a rate and in such relative amounts as to permit the material to be thoroughly clinkered, the load of material in transit toward the combustion zone being sufficient to reduce the temperature of the products of combustion and chemical decomposition to the neighborhood of or below a red heat or about 1000 degrees F. (2) To the feeding of the material toward the combustion zone in such relative amounts and at such a rate of progression that the material will be gradually heated to a clinkering temperature and will be substantially freed of carbon dioxid when the clinkering temperature is reached. (3) To the regulation of the clinkering operation on the material by controlling the velocity of the combustion and decomposition gases after the latter pass from contact with the incoming material. (4) Supplementing the clinkering operation by causing the clinkered material to travel at a relatively slow speed in contact with the incoming air necessary for combustion; and in other operations and methods, all of which will be more fully described and claimed.

In order that the invention may be better understood, attention is directed to the accompanying drawings showing one of my improved kilns and wherein the present method or process may be carried out, said drawings forming a part of this specification and in which—

Fig. 10, a horizontal sectional view on an enlarged scale, showing the rear end of the kiln, and the projecting nozzles; Fig. 11, an enlarged detail view through a part of the kiln, illustrating the reamed and holding bolts, respectively, for securing the sections of the kiln together; and, Fig. 12, a diagrammatic view, illustrating the preferred generators and motors employed in the operation of the apparatus.

In all the above views, corresponding parts are represented by the same reference numerals.

The kiln is formed of cast iron sections 1, having flanges 2 bolted together and supported on rollers 3. The kiln is supported at a slight inclination from the horizontal and is rotated at the proper speed by a motor 4 of any suitable type. At its lower or discharge end, the kiln opens into a chamber 5 and discharges the clinkered material into the cooling chamber 6, driven by a motor 7. At its upper end, the kiln opens into a chamber 8 from which leads a stack 9 of any suitable construction. The cement material or "chalk" is fed into the kiln at its upper end by a screw conveyer 10, driven by a motor 11 and supplied by a hopper 12; a scraper conveyer 13 continuously supplies material to this hopper.

14 represents two fuel projecting nozzles of any suitable construction for projecting two streams of pulverized coal into the kiln at different distances to form extended clinkering zones, which preferably overlap, as I describe in my Patents Nos. 759,356 and 759,357, dated May 10th, 1904. The fuel for these nozzles is supplied from a hopper 15, in any suitable way. As previously stated, the amount of air for forcing coal into the kiln is relatively small as compared to the air necessary to support combustion, in order that the main column of air (drawn in by the injective effect of the two blasts and by the natural draft) may not be seriously affected by any whirl or eddy currents, to thereby retard the operation.

Figures 3, 4:
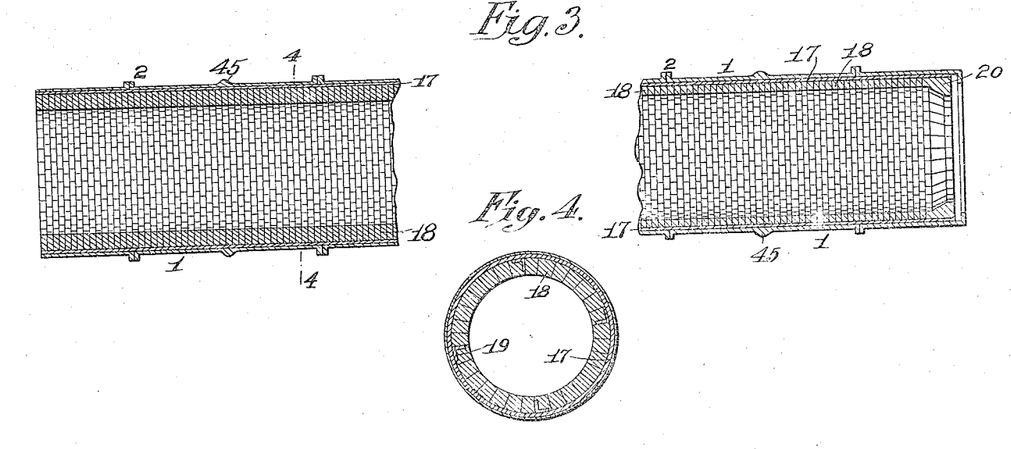
Fig. 3, an enlarged sectional view through the kiln, illustrating particularly the asbestos layer between the outer shell and the firebrick lining.
Fig. 4, a section on the line 4—4 of Fig. 3.

Preferably, instead of using a single roller for taking up the longitudinal thrust, I employ two rollers 16—16, for this purpose, so that if one becomes broken, the other will still perform its function and hold the kiln from dropping off the supporting rollers 3. On its interior, the kiln is first lined with a layer of asbestos 17, and on this layer are placed the usual firebricks 18. My purpose in employing the layer of asbestos described, is to reduce radiation and offer a yielding backing for the firebricks, so that when the latter expand under the heat, the asbestos will yield and thereby prevent injury to the cast iron shell. Since the firebrick lining 18, is not rigidly secured to the shell, I prefer to employ angle irons 19 (Figs. 4 and 11) which extend longitudinally of the kiln, so as to prevent any circumferential shifting of the firebrick lining under the effect of the heavy loads. At its upper end, the firebrick lining is contracted somewhat to form a lip 20, which prevents the unburned material from flowing out at the upper end, even when a very considerable quantity accumulates within this lip. As shown in Fig. 3, the firebrick lining is normally somewhat shorter than the metallic outer shell to permit of the longitudinal expansion of the lining under the effect of the heat.

Figures 5, 6:
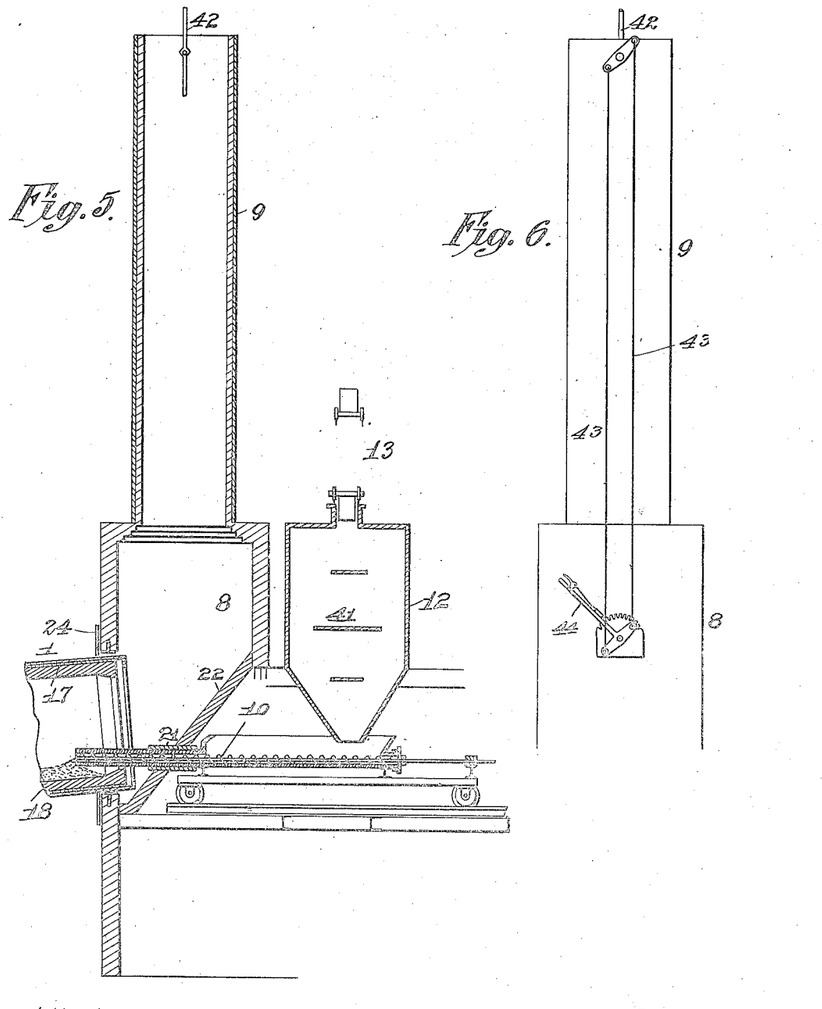
Fig. 5, an enlarged sectional view, showing the upper end of the kiln and the stack with the means for supplying the material to the kiln.
Fig. 6, an exterior view of the stack, showing convenient means for operating the damper.

As shown, particularly in Fig. 5, the conveyer 10 is arranged close to the bottom of the kiln and extends substantially parallel with its longitudinal axis, so that the material is packed into the kiln in successive increments without the formation of any dust. The conveyer passes through a firebrick sleeve 21, arranged in the inclined partition 22, in the chamber 8, at the base of the stack 9. Any material which may settle in the chamber 8 will accumulate on the bottom of the partition 22 and will be prevented from escaping around the kiln by a sheet metal washer 24, which closely fits the kiln, as shown, and when it reaches a certain quantity the excess passes into the kiln.

Figure 1:
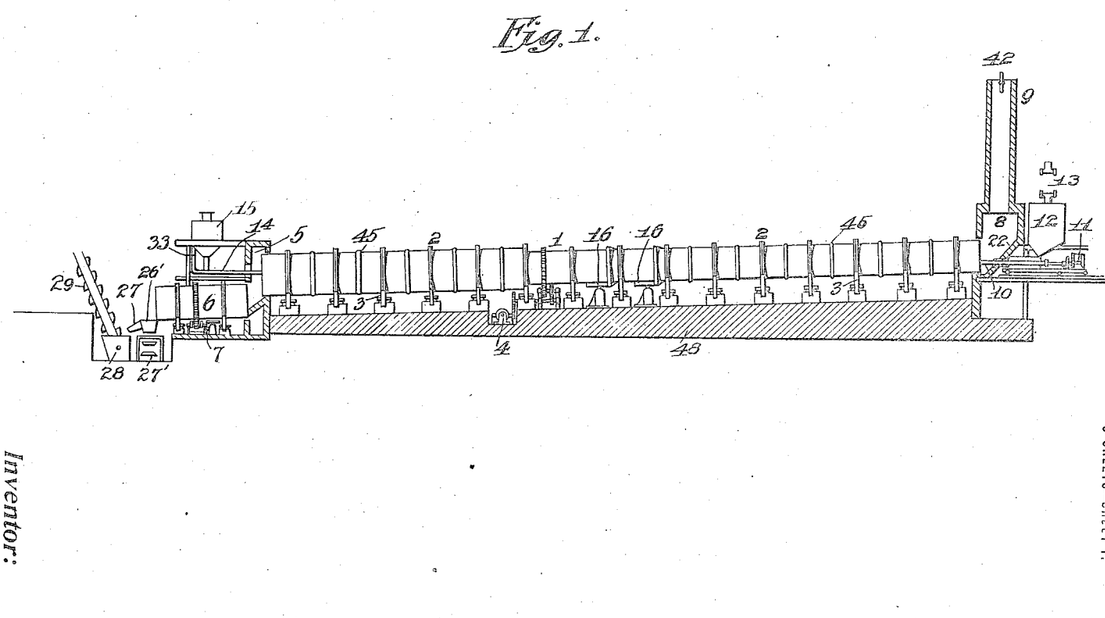
Figure 1, is a side elevation partly in section of the kiln, embodying my improvements, and illustrating the same in the preferred proportions.
Figure 2:
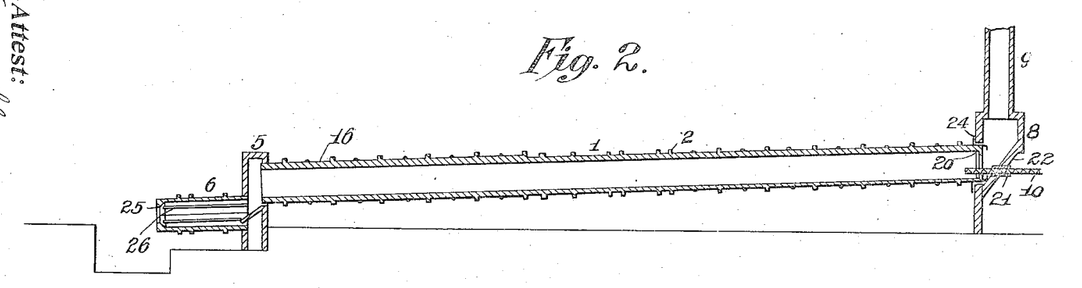
Fig. 2, a longitudinal sectional view.
Figures 7, 8, 9:
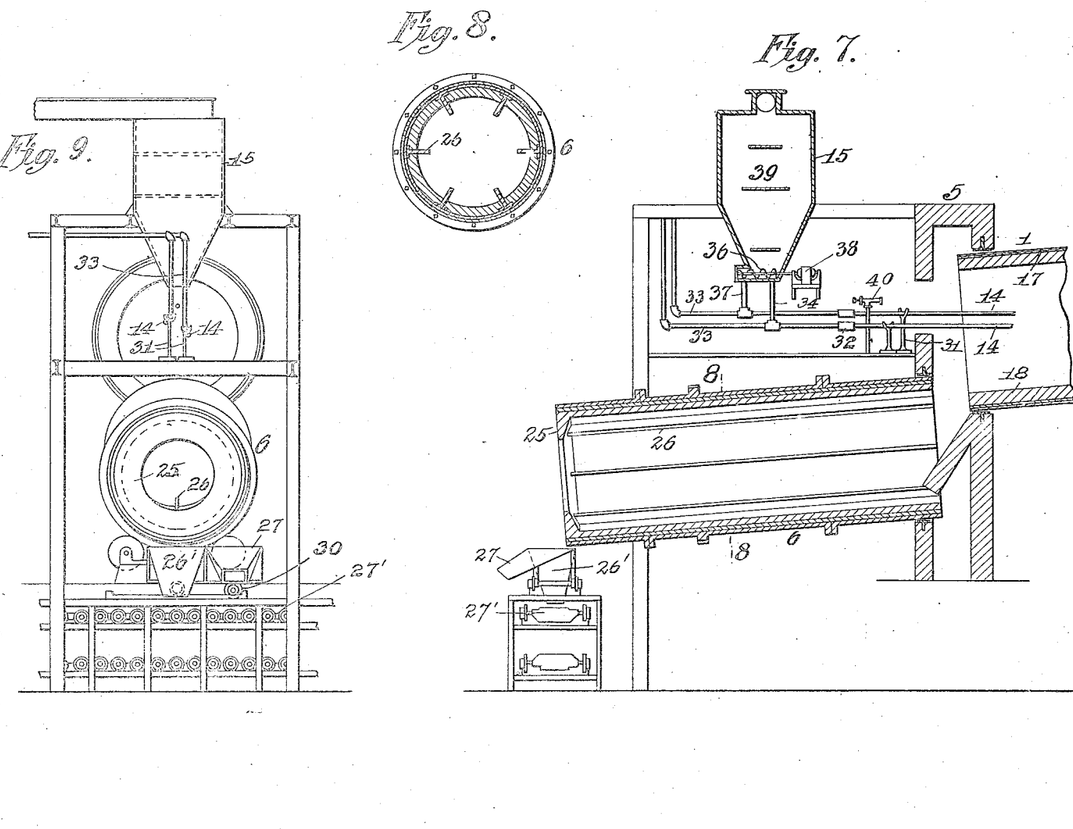
Fig. 7, an enlarged sectional view showing the lower end of the kiln, the cooler, the fuel bin and the projecting nozzles.
Fig. 8, a section through the cooler on the line 8—8 of Fig. 7.
Fig. 9, a rear elevation of the apparatus.

The cooling cylinder 6 is preferably formed with a lip 25 at its lower end, so as to contract the discharge opening, and it is furthermore preferably provided with radial wings 26 for the purpose of elevating the clinkered material and showering it downward through the incoming combustion air. Preferably the motor 7, for driving the cooling cylinder is so proportioned as to rotate the cylinder at a relatively low surface speed to thereby permit of the accumulation of a large load of material therein, so as to present an extended surface to the incoming combustion air. From the cooling cylinder 6, the material normally discharges through a hopper 26' onto a conveyer 27', (Figs. 7 and 9). If, however, by accident the quality of the material is objectionable the hopper 26' may be shifted to one side, so as to bring a chute 27 in line with the cooling cylinder, whereby material will be discharged into the boot 28 of an elevator 29 (Fig. 1) and by the latter carried to a suitable dump. In order that the hopper 26' and chute 27 may be simultaneously shifted, they are both supported in a suitable frame carried on wheels 30.

The projecting nozzles 14—14 as shown, are supported on suitable standards or other supports 31, and are provided with couplings 32, made of rubber tubing, so as to permit the nozzles to be directed in any desired direction. Instead of the flexible coupling 32, any other universal joint may be employed, such as a ball and socket joint. Leading into the back ends of the nozzles 14 are air pipes 33, supplied with air at different pressures. In practice, one of these air pipes is supplied with air at a pressure of one hundred pounds to the inch, and the other with air at a pressure of forty pounds, but these pressures may vary within wide limits. Pulverized coal is supplied directly to the high pressure nozzle through a pipe 34 from the coal-bin 15. Mounted within this bin at its lower end is a small conveyer 36 which supplies coal to the pipe 37 leading to the low pressure nozzle. The screw conveyer is driven by a small electric motor 38. Preferably, the bin is provided with partitions 39 therein, on which material may accumulate. By using these shelves, I relieve the pressure at the lower end of the bin, and therefore prevent the material from packing, so that the material freely enters the pipes 34 and 37.

In order to observe the interior of the kiln, I provide a telescope 40, having a darkened glass. Through this telescope may be observed the line of demarcation between the material in the clinkering zone and the material beyond the clinkering zone, so that by regulating the feed of the conveyer 36, the position of the clinkering zone can be varied.

As shown, the nozzles 14, are directed at an angle to both the vertical and horizontal axial planes of the kiln, so that the projected fuel will strike the bore of the kiln with a glancing effect and at an angle to the longitudinal axis thereof. This causes the fuel to partake of a spiral course through the kiln and this fact may be observed through a telescope 40. These spirals have been seen to preserve their identity until combustion has been completed. By causing the fuel to follow spiral paths through the kiln, as I have explained, the heat is very perfectly diffused, and at the same time the projected air is retarded with the advantages before pointed out.

The hopper 12, for the unburnt material is preferably provided with shelves or partitions 41, corresponding with the partitions 39, and which are used for a similar purpose.

In order to properly regulate combustion within the kiln, I provide the stack 9 with a damper 42, which may be operated in any suitable way, as for instance, by wires 43 from a hand lever 44, as shown particularly in Figs. 5 and 6.

Figures 10, 11, 12:
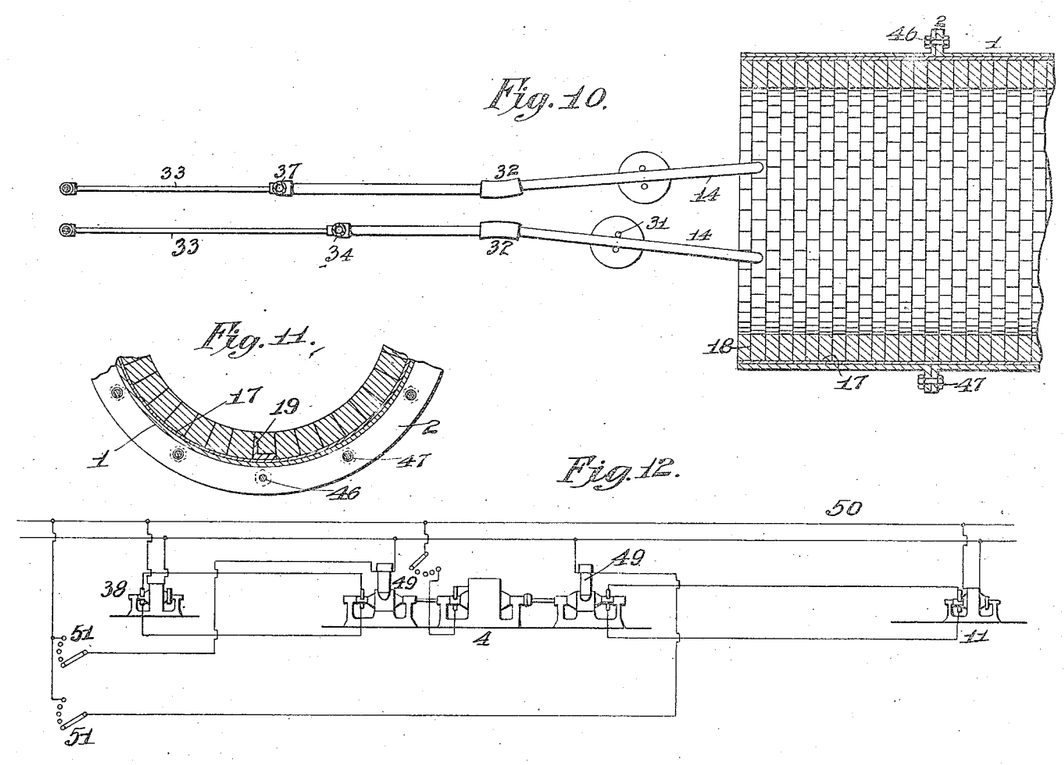

As I have before explained, the kiln is formed of cast-iron sections, carried on supporting rollers 3. Preferably each section is formed centrally with a rib 45 for strengthening the same against bursting strains incurred during casting. The sections are secured together by bolts passing through their flanges, as shown in Fig. 11. A certain number of these bolts 46 (say four for each section) are accurately fitted within reamed openings within the flanges, so as to center the flanges and hold them in perfect alinement. The other bolts 47 may loosely engage openings in the flanges and are used merely for holding the sections together. This construction provides for economical manufacture without sacrificing accuracy in any way. It is, in fact, essential that the kiln as a whole, should be constructed with absolute rigidity and without any possibility of any of its sections getting out of alinement. This becomes possible by making a kiln of cast iron sections, as explained, so that it does not warp or become distorted under the effect of heat and by carrying the rollers 3 on the foundation 48, (Fig. 1) made integral and continuous throughout and preferably formed of concrete so as to constitute a base for sustaining the rollers 3 against any possibility of derangement in practice. Consequently, the only movement of the kiln relatively to the supporting rollers, is due to the longitudinal expansion or shrinkage of the kiln under changes in temperature, but by mounting the thrust rollers 16 at or near the center of the kiln, it will be obvious that the maximum expansion with respect to the supporting rollers 3, at the ends will be only substantially half as much as it would be if the thrust rollers were mounted at one end of the kiln.

The motors 11 and 38 for controlling the feed of the unburnt material and fuel respectively, are preferably controlled by an operator stationed adjacent to the projecting nozzles or guns 14. The preferable electric connections are shown in Fig. 12, wherein the motor 4 for driving the kiln is illustrated as also driving a pair of small generators 49, whose fields are shown as being connected across a supply circuit 50, each field including a controller 51. The armatures of these generators are shown as being connected in series with the armatures of the motors 11 and 38 respectively. The fields of the motors 11 and 38 are shown as being constantly excited from the supply circuit 50. Consequently, each motor 11 and 38 is provided with a constantly excited field, within which works an armature supplied with a regulable current, dependent of course, upon the fields of the generators 49. It thus becomes possible, by means of the controllers 51, to regulate the strength of the fields of the generators 49, resulting in a corresponding variation in the output of these generators and a corresponding regulation in the speed of the two subsidiary electric motors, while at the same time, by operating the generators 49 from the motor 4, a break down of the latter resulting in the stoppage of the kiln, will result automatically in arresting the feed of the fuel and unburnt material to the same, as will be understood.

As already indicated, the characteristic feature of my improved kiln resides in the great length which I have adopted and the essentially different relation between the length and internal diameter, as compared with the existing kilns. In other words, the length of the kiln is preferably about two and one-half times that of standard kilns, or about one hundred and fifty feet. I do not consider it practicable, under existing conditions to substantially increase this length, owing to the great expense which would be thereby involved, and although the length may be decreased to as low as one hundred feet, such a change will result in a substantially proportionate decrease in practical efficiency. In any event, the length of the kiln should be such as to permit of substantially perfect combustion of the fuel, and to result in the substantially complete elimination of carbon dioxid from the material before the latter reaches the combustion zone. The relative proportions of my improved kiln as to the length and internal diameter are preferably about twenty-seven to one (i. e., 150 feet to 5.5 feet) instead of substantially twelve to one (i. e. sixty feet to five feet) as with the present kilns, and although these proportions may also be somewhat varied, changes therein may affect the efficiency. By making use of a kiln of great length, as described, whose diameter is much less than one-twelfth of the length as explained, it becomes possible to perfectly burn therein great quantities of pulverized fuel in the presence of proportionately greater quantities of cement material, and to thereby result in the production of an apparatus which not only turns out from four to seven times as much clinker (dependent, of course, upon the load carried), but which also permits the clinker to be obtained much more economically than with the present kilns. By reason of the size and proportions which I have adopted, I am enabled to carry on the operation with a minimum amount of fuel per unit of product, and hence with the highest efficiency and greatest output per man and for the investment. I have already stated in detail the results which accrue from the indicated changes and the advantages incident to the same, and these need not be here repeated, except by a brief recapitulation.

(1) By employing a kiln of great length, as explained, preferably about one hundred and fifty feet, opportunity is offered for the gases or other products of combustion to be cooled sufficiently between the combustion zone and the stack as to leave the kiln well below a red heat. Consequently, the material in its passage from the upper end of the kiln to the combustion zone is gradually elevated in temperature instead of having its temperature quite abruptly raised, as occurs in kilns of the usual length.

(2) By adopting proportions for the kiln, wherein the length will be much more than twelve times the diameter, preferably almost thirty times the diameter, perfect combustion of a relatively large bulk of pulverized fuel can be maintained, since by the time the material reaches the combustion zone, it will have parted with substantially all of its carbon dioxid, and this latter element will not be present to make the combustion imperfect.

(3) By being capable of perfectly burning a large bulk of pulverized fuel, it is possible to extend the combustion zone as much as forty feet or more in length, so that the material will be maintained within the clinkering temperature for a sufficiently long period, as to be thoroughly clinkered from periphery to center. At the same time, the material in its passage toward the combustion zone is undergoing a slow, but gradual increase in temperature, permitting the reactions to take place slowly, so that when the material reaches the combustion zone, a comparatively slight increase in temperature is necessary to clinker the same.

(4) By reason of the fact that in a very long kiln, I am enabled to perfectly burn a much larger bulk of pulverized fuel than heretofore, and to maintain within the kiln an extended combustion zone, as explained, I find it possible to maintain in the kiln a load of from five to seven times that ordinarily employed, thereby making the output economical and offering better opportunity for extraction of heat from the escaping gases and products of combustion. The weight of the mass of the heavy load also results in the formation of a coating of material on that portion of the inner surface of the kiln where the temperatures are highest, and in this way the firebrick lining will be more effectively protected from the heat. The coating so formed is several inches in thickness and is substantially continuous throughout. Although in cement kilns of present dimensions, more or less of the plastic material adheres to the lining, a complete continuous and practically homogeneous coating is not secured as with my kiln. Obviously, if any of the factors referred to are materially changed, a sacrifice in efficiency results. If, for example, the length of the kiln were decreased and the load kept constant, the escaping gases or other products of combustion would leave the stack at an objectionably high temperature. This would also be true if the load of material were materially reduced. If the diameter of the kiln is materially decreased, it becomes impossible to effectively use a large load. If the length of the clinkering zone is materially reduced, sufficient time is not offered for an effective and thorough clinkering of the material, and the temperature in a smaller zone would have to be dangerously high to burn a full load. Finally, if sufficient time is not allowed for the passage of the incoming material toward the combustion zone in contact with the escaping gases and products of combustion, opportunity will not be offered for the expulsion of the carbon dioxid from the material, and carbon dioxid would be brought into the combustion zone to disturb the desired perfect character of the combustion.

In view of the great length of my kiln, and the consequent longitudinal expansion to which it is subjected, there will be great danger when the kiln is allowed to cool of the contraction stripping the bolts or straining the wheel supports between the sections, since obviously, the weight of the kiln is very great. I find, however, that by continuing the rotation of the kiln until it has cooled sufficiently to arrest the contraction, this danger is entirely overcome.

Having now described my invention, what I claim as new and desire to secure by Letters Patent is as follows:—

1. The method of burning cement clinker in a rotary kiln which consists in creating and maintaining within said kiln a clinkering zone by continually burning fuel therein, in maintaining a load of cement material within said kiln by feeding said material into and slowly through the kiln, in continuously agitating and subjecting said material to the heat from the gases of combustion resulting from said burning fuel and passing up through said kiln for such a length of time that said material is substantially completely calcined before it reaches the clinkering zone and to the heat of said burning fuel for such a length of time that said material is thoroughly clinkered in the clinkering zone and in maintaining a substantially continuous coating of material on that portion of the inner surface of the kiln where the temperatures are highest, by continuously agitating and subjecting to the action of the burning fuel such quantity of suitable cement material that the weight thereof will be sufficient, when the cement material becomes plastic by reason of the heat, to maintain such coating, substantially as described.

2. The method of burning cement clinker in a rotary kiln which consists in creating and maintaining within said kiln a clinkering zone by continually burning fuel therein, in maintaining a load of cement material within said kiln by feeding said material into and slowly through the kiln, in continuously agitating and subjecting said material to the heat from the gases of combustion resulting from said burning fuel and passing up through said kiln for such a length of time that said material is substantially completely calcined before it reaches the clinkering zone and that the gases issuing from the kiln are reduced in temperature to approximately a red heat and to the heat of said burning fuel for such a length of time that said material is thoroughly clinkered in the clinkering zone and in maintaining a substantially continuous coating of material on that portion of the inner surface of the kiln where the temperatures are highest, by continuously agitating and subjecting to the action of the burning fuel such quantity of suitable cement material that the weight thereof will be sufficient, when the cement material becomes plastic by reason of the heat, to maintain such coating, substantially as described.

3. The method of burning Portland cement clinker which consists in maintaining within a rotating kiln a clinkering and a calcination zone, each of which is at least fifty per cent. greater in length than the corresponding zone in standard 60-foot kiln practice, in feeding continuously therethrough a load of substantially dry material at least four times as great as the normal load in said practice, and in rotating said kiln with sufficient rapidity to bring the portions of the kiln lining exposed to the heat of the fuel beneath the load of material in the kiln before the adherent clinker lining is undesirably stripped therefrom, substantially as set forth.

4. The method of burning Portland cement clinker which consists in maintaining within a long rotary kiln a combined calcining and clinkering zone more than twice as long as in standard 60-foot kiln practice, in continuously feeding through said kiln more than four times as much substantially dry cement material as in standard 60-foot kiln practice and in maintaining the clinkering and calcination action of the burning fuel and products of combustion on the cement material for more than twice the extent used in standard 60-foot kiln practice and in rotating said kiln with sufficient rapidity to maintain an adherent protecting lining of clinker thereon by the weight of cement material in said clinkering zone by bringing the portions of the kiln lining exposed to the heat of the fuel beneath the load of material in the kiln before the adherent clinker lining is undesirably stripped therefrom.

5. The method of burning Portland cement clinker in a large diameter rotary kiln which consists in burning within said kiln at least twice as much fuel per hour as is used in standerd 60-foot kiln practice, in feeding into and slowly down through said kiln and exposed to the heat from said fuel and its gases of combustion, a load of substantially dry cement material more than six times as great as in said standard 60-foot kiln practice, in calcining and clinkering such material, in maintaining a protecting lining of clinker on the kiln lining of the clinkering zone by the weight of material therein, and in rotating said kiln with sufficient rapidity to bring the portions of kiln lining exposed to the heat of the fuel beneath the load of material in the kiln before the adherent clinker lining is undesirably stripped therefrom, substantially as set forth.

6. The method of burning Portland cement clinker in a long rotary kiln which consists in burning within said kiln at least twice as much fuel per hour as is used in standard 60-foot kiln practice, in feeding into and slowly down through said kiln and exposed to the heat from said fuel and its gases of combustion, a load of substantially dry cement material more than twice as great as in said standard 60-foot kiln practice, in calcining and clinkering such material, in maintaining a protecting lining of clinker on the kiln lining of the clinkering zone by the weight of material therein and in rotating said kiln with sufficient rapidity to bring the portions of kiln lining exposed to the heat of the fuel beneath the load of material in the kiln before the adherent clinker lining is undesirably stripped therefrom, substantially as set forth.

This specification signed and witnessed this 28th day of September, 1905.

THOS. A. EDISON.

Witnesses:
FRANK L. DYER,
ANNA R. KLEHM.